United States Patent Office 3,709,955
Patented Jan. 9, 1973

3,709,955
PALLADIUM COMPLEX OLEFIN DIMERIZATION
Howard E. Dunn, Mount Vernon, Ind., assignor to
Phillips Petroleum Company
No Drawing. Filed Mar. 23, 1970, Ser. No. 22,097
Int. Cl. C07c 3/10
U.S. Cl. 260—683.15 D          4 Claims

ABSTRACT OF THE DISCLOSURE

An acyclic olefin is dimerized with a catalyst formed from an organoaluminum compound and a palladium complex such as bis(benzonitrile) dichloropalladium, bis($\pi$ - cyclohexenyl)dichlorodipalladium, di-$\mu$-chlorobis (N,N-dimethylbenzylamine - 2,C,N)dipalladium and bis (picolinato)palladium.

---

This invention relates to a method for the dimerization of olefins.

Many processes have been developed for the dimerization of olefins. However, few of these processes have provided catalyst systems having high selectivity to linear olefin dimers.

It now has been discovered that certain palladium-containing catalysts, when applied to certain acyclic olefins, yield an unexpectedly high quantity of linear olefin dimers. For example, the dimerization of propylene according to the process of this invention produces $C_6$ olefins including a predominating amount of normal hexenes, as high as 92 percent. Typically, 10 to 40 percent normal hexenes are produced by conventional dimerization catalyst systems.

Accordingly, it is an object of this invention to provide a process for the dimerization of olefins.

Other objects, aspects and advantages of this invention will become apparent to one skilled in the art upon consideration of the following disclosure and appended claims.

I have found that $C_2$ to $C_{12}$ acyclic olefins are dimerized according to the process of this invention by contacting the olefin with a catalyst formed by the admixture of an organoaluminum compound represented by the formula $R''_nAlX_m$ in combination with a complex of palladium, as subsequently defined, where $R''$ is an alkyl, alkenyl, aryl, or a cycloalkyl radical, or a combination thereof such as an alkaryl or aralkyl radical, having from 1 to 12 carbon atoms, X is a halogen, $n$ can be the integer 1, 2, or 3, $m$ can be 0 or the integer 1 or 2, and the sum of $n$ and $m$ equals 3. I have further found that according to this invention a catalyst formed by the admixture of the two components disclosed above has a high selectivity for the production of linear dimers of olefins such as propylene.

Some specific examples of the organoaluminum component of the catalyst system are: methylaluminum dichloride, dimethylaluminum chloride, diethylaluminum bromide, ethylaluminum dibromide, triethylaluminum, vinylaluminum diiodide, tributylaluminum, dibutylaluminum fluoride, phenylaluminum dibromide, dibenzylaluminum chloride, 4-tolylaluminum dichloride, dodecylaluminum dibromide, and the like, and mixtures thereof such as methylaluminum sesquichloride, Presently preferred aluminum compounds are organoaluminum halides, particularly those containing radicals of the lower hydrocarbons such as methyl and ethyl.

The palladium(II) complex components of the catalyst system of this invention can be represented by the following structural formulas:

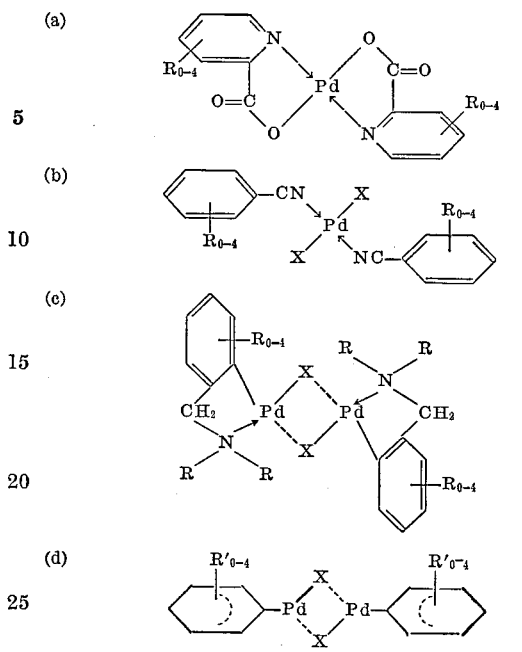

wherein each R is a monovalent hydrocarbon radical having from 1 to about 12 carbon atoms per radical; each R' is either methyl or ethyl; and wherein each X is selected from chlorine, bromine, iodine, or fluorine, preferably chlorine.

These palladium complexes can be prepared by conventional methods known to the art. For example, the picolinic acid complexes of palladium can be prepared by the method of Cox, Wardlaw, and Webster, J. Chem. Soc. 775 (1936); benzonitrile complexes of palladium halides can be prepared by contacting a palladium salt such as $PdCl_2$ and benzonitrile at elevated temperatures of about 140° C. until the complex is formed; the N,N-substituted benzylamine complexes of palladium can be prepared by the method of Cope and Friedrich, J.A.C.S. 90, 909 (1968); and the $\pi$-cyclohexenyl complexes of palladium halides can be conveniently prepared such as by contacting $Na_2PdCl_4$ with 1,3-cyclohexadiene in a solvent such as acetic acid at room temperature.

Specific examples of applicable palladium complexes are:

bis(picolinato)palladium(II)
bis(4-methylpicolinato)palladium(II)
bis(3,4,5-triethylpicolinato)palladium(II)
bis(3-cyclohexylpicolinato)palladium(II)
bis(4-benzylpicolinato)palladium(II)
bis(5-vinylpicolinato)palladium(II)
bis(4-propargylpicolinato)palladium(II)
bis(3-dodecylpicolinato)palladium(II)
bis(benzonitrile)dichloropalladium(II)
bis(2,3,4,5-tetramethylbenzonitrile)dibromopalladium-
    (II)
bis(4-naphthylbenzonitrile)diiodopalladium(II)
bis(3-isobutylbenzonitrile)difluoropalladium(II)
bis(4-cyclopentylbenzonitrile)dichloropalladium(II)
di-$\mu$-chloro-bis(N,N-dimethylbenzylamine-2,C,N)
    dipalladium(II)
di-$\mu$-bromo-bis(3-octyl-N,N-diamylbenzylamine-2,C,N)
    dipalladium(II)
di-$\mu$-iodo-bis(N-methyl-N-allybenzylamine-2,C,N)
    dipalladium(II)
di-$\mu$-fluoro-bis(4-cyclooctyl-N,N-dimethylbenzylamine-
    2,C,N)dipalladium(II)

di-$\mu$-chloro-bis(N-ethyl-N-isobutylbenzylamine-2-C,N) dipalladium(II)
di-$\mu$-chloro-bis($\pi$-cyclohexenyl)dipalladium(II)
di-$\mu$-bromo-bis($\pi$-cyclohexenyl)dipalladium(II)
di-$\mu$-chloro-bis(4-ethyl-$\pi$-cyclohexenyl)dipalladium(II)
di-$\mu$-bromo-bis(3,4,4,5-tetramethyl-$\pi$-cyclohexenyl) dipalladium(II)
di-$\mu$-iodo-bis($\pi$-cyclohexenyl)dipalladium(II)
di-$\mu$-fluoro-bis($\pi$-cyclohexenyl)dipalladium(II)

and the like and mixtures thereof.

The components of the catalyst are usually combined in proportion in a range of 0.5:1 to about 20:1 moles of organoaluminum compound per mole of palladium complex. Catalyst poisons in the system can be scavenged by employing even greater proportions of the organoaluminum component.

The catalyst of the present invention is prepared by combining the first and second components of the catalyst under conditions of time and temperature which permit the active catalyst to be formed. The two components of the catalyst can be mixed at any convenient temperature within the range of about −80 to about 100° C. for a period of time ranging from a few seconds up to several hours in the presence of a diluent in which both of the two components are at least partially soluble. Examples of suitable solvents or diluents are benzene, cyclohexane, chlorobenzene, methylene chloride, ethylene chloride, and the like. However, halogenated diluents are preferred. The forming of the catalyst by admixing the two components is generally carried out in an inert atmosphere and in the substantial absence of air or moisture. After the catalyst is formed, it need not be isolated but can be added directly to the reaction zone as a solution or suspension in its preparation medium. If desired, the components used to form the catalyst can be separately added, in any order, to the reaction zone either in the presence or absence of the feed olefin.

The olefins to which the present dimerization process is directed include acyclic monoolefins having from about 2 to 12 carbon atoms, preferably 2 to 6 carbon atoms, inclusive, where the acyclic monoolefin can be a terminal or an internal olefin, branched or unbranched, but preferably has no branching nearer than the 3-position to the double bond. Unbranched olefins are presently preferred. Examples of suitable monoolefins which can be used according to the present invention are ethylene, propylene, butene-1-, butene-2, pentene-1, pentene-2, 3-methyl-butene-1-, hexene-2, heptene-1, 4,4-dimethyl-heptene-2, decene-1, dodecene-1, and the like, and mixtures thereof. The presently preferred olefins are ethylene and propylene. Mixtures of olefins can be contacted with the catalysts to form "codimers"; for example, ethylene and butylenes react to form hexenes, propylene and butylenes react to form heptenes, etc.

The dimerization of the olefin or mixture of olefins can take place at temperatures within the range of −80 to about 200° C., and preferably within the range of −10 to about 50° C. Normally, it is desirable to carry out the dimerization reaction under pressures ranging up to about 2000 p.s.i.g., and preferably 20–500 p.s.i.g. The dimerization can be carried out in the presence of a diluent such as that used for the catalyst preparation if desired. The time of contact of the olefin with the catalyst for the dimerization of the olefin will vary depending upon the desired degree of conversion but, generally will be within the range from about 0.1 minute to about 20 hours, preferably 5 to 120 minutes. The proportion of catalyst composition of olefin feed in the reaction zone will generally be within the range of about 0.0001 to about 100 millimoles of palladium complex per mole of olefin feed.

Any conventional contacting technique can be utilized for the olefin dimerization and batchwise or continuous operations can be utilized. After the desired degree of conversion of the olefin to the dimer, the products so formed can be separated and isolated by conventional means such as by fractionation, crystallization, adsorption, and the like. The unconverted feed material can be recycled to the reaction zone. If desired, the catalyst can be destroyed by treatment with suitable deactivating agents such as water or alcohol, prior to the separation of the products.

The dimers produced and the dimerization of olefins can be used for many purposes. For example, olefin dimers such as propylene dimers can be employed to make oxo alcohols which are used in the preparation of plasticizers such as for plasticizing polyvinyl chloride resins. Also propylene dimers can be cracked by conventional methods to make isoprene.

The advantages of this invention are further illustrated by the following example. The reactants and the proportions and other specific conditions are presented as being typical and should not be construed to limit the invention unduly.

EXAMPLES I–V

In each of the following examples, a 0.1–0.2 millimole quantity of palladium complex and 20–30 ml. chlorobenzene were added to a stirrer-equipped 7-ounce reaction flask which had previously been dried and flushed with nitrogen. Propylene was then pressured into the flask at 30 p.s.i.g. and then the pressure was reduced to about 5 p.s.i.g. A variable quantity of ethylaluminum dichloride (EADC) in chlorobenzene solution was then added to the flask. The propylene pressure was then increased to the indicated level and the reaction mixture was allowed to stir for the indicated time while the flask was maintained at the indicated temperature.

After the reaction period, the reaction was terminated by the addition of 10 ml. water. The organic layer was decanted off and distilled at about atmospheric pressure, the $C_6$ olefin fraction being collected. The selectivity to the dimers, in each test was about 80 percent or more. A 2 ml. sample of the hexenes was conventionally hydrogenated over $PtO_2$ hydrogenation catalyst to determine the distribution of the hexene isomers obtained.

TABLE I.—DIMERIZATION OF PROPYLENE

| Run | Pd complex (millimoles) | EADC[1] (millimoles) | Chlorobenzene, ml. | Temp., °C. | Propylene pressure, p.s.i.g. | Dimers, g. | Isomer distribution of hydrogenated dimers | | | | |
|---|---|---|---|---|---|---|---|---|---|---|---|
| | | | | | | | C C<br>C–C–C–C | C<br>C–C–C–C–C | C<br>C–C–C–C–C | | n-$C_6$ |
| 1 | "A" (0.1) | 5.0 | 30 | 80 | 100 | 1.0 | 0.32 | 5.65 | 0.58 | | 92.52 |
| 2 | "A" (0.2) | 5.0 | 20 | 80 | 20–75 | 2.8 | 2.1 | 17.2 | 0.7 | | 80.0 |
| 3 | "B" (0.1) | 1.5 | 20 | 25 | 30 | 0.4 | | 10.9 | t | | 89.1 |
| 4 | "C" (0.1) | 3.0 | 20 | 23 | 30 | 4.8 | 4 | 44 | 3 | | 49 |
| 5 | "D" (0.1) | 1.5 | 20 | 22 | 30 | 1.6 | 3.0 | 49.8 | 1.8 | | 45.4 |

[1] EADC = Ethylaluminum dichloride.

NOTES.—Complex "A"=Bis(picolinato)palladium(II); Complex "B"=Bis(benzonitrile)dichloropalladium(II); Complex "C"=Di-$\mu$-chloro-bis-(N,N-dimethylbenzylamine-2,C,N)dipalladium(II); Complex "D"=Di-$\mu$-chloro-bis($\pi$-cyclohexenyl)dipalladium(II).

The examples demonstrate that the catalyst system of this invention is very selective for the production of the linear dimer, normal hexene, from the dimerization of propylene.

Although this invention has been described in considerable detail, it must be understood that such detail is for the purposes of illustration only and that many variations and modifications can be made by one skilled in the art without departing from the scope and spirit thereof.

I claim:
1. A process for the dimerization of propylene which comprises contacting propylene under dimerization conditions, with a catalyst consisting essentially of the material that is formed on mixing a palladium complex represented by one of the following formulas:

(a)
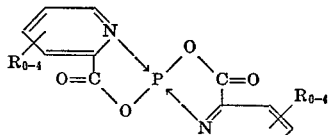

(b)
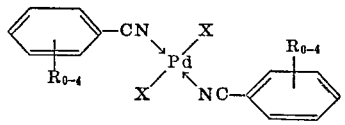

(c)
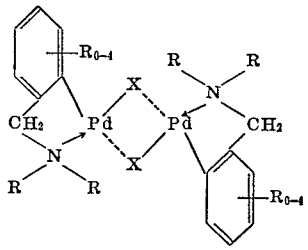

with an organoaluminum compound having the formula $R'_nAlX_m$ wherein each R is a monovalent hydrocarbon radical having from 1 to 12 carbon atoms per radical; R' is an alkyl, alkenyl, aryl, or a cycloalkyl radical or a combination thereof having 1 to 12 carbon atoms; X is a halogen; $n$ is an interger 1, 2 or 3; $m$ is 0 or the integer 1 or 2; and $n$ plus $m$ equals 3.

2. A process according to claim 1 wherein the contacting is carried out at a temperature ranging from $-80$ to $200°$ C., under a pressure sufficient to maintain the resulting admixture substantially in a liquid phase, and for a time ranging from 0.1 minutes to 20 hours, wherein 0.5 to 20 moles of the organoaluminum compound are employed per mol of the palladium complex and 0.001 to 100 millimoles of palladium complex are employed per mol of said propylene.

3. A process according to claim 1 wherein the organoaluminum compound is selected from the group consisting of methylaluminum dichloride, dimethylaluminum chloride, ethylaluminum dichloride, diethylaluminum chloride, methylaluminum sesquichloride and ethylaluminum sesquichloride.

4. A process according to claim 1 wherein said palladium complex is bis(picolinato)palladium(II), bis(benzonitrile)dichloropalladium(II), or di-$\mu$-chloro - bis(N,N-dimethylbenzylamine-2,C,N)dipalladium(II).

References Cited
UNITED STATES PATENTS

| | | | |
|---|---|---|---|
| 3,398,209 | 8/1968 | Schneider | 260—680 |
| 3,379,706 | 4/1968 | Wilke | 260—683.15 X |
| 3,558,736 | 1/1971 | Bergem et al | 260—683.15 |
| 3,480,632 | 11/1969 | Scheben et al. | 260—268 |

FOREIGN PATENTS

| | | | |
|---|---|---|---|
| 1,153,519 | 5/1969 | Great Britain | 260—683.15 |
| 1,519,181 | 2/1968 | France | 260—683.15 |

PAUL M. COUGHLAN, Jr., Primary Examiner

U.S. Cl. X.R.

252—431 R, 431 N; 260—429 R, 429 L